H. C. BOSTIAN.
EXPANSION COUPLING FOR HOSE.
APPLICATION FILED MAR. 26, 1909.

941,355.

Patented Nov. 30, 1909.

Witnesses
J. G. Strikel
J. J. McCarthy

Inventor
Homer C. Bostian
by Foster Freeman Watson Hirt
Attorneys

UNITED STATES PATENT OFFICE.

HOMER C. BOSTIAN, OF MILTON, PENNSYLVANIA, ASSIGNOR OF ONE-THIRD TO BENJAMIN BUDD CANNON AND ONE-THIRD TO J. EDWARD HASTINGS AND PENN G. HASTINGS, ALL OF MILTON, PENNSYLVANIA.

EXPANSION-COUPLING FOR HOSE.

941,355. Specification of Letters Patent. Patented Nov. 30, 1909.

Application filed March 26, 1909. Serial No. 485,962.

*To all whom it may concern:*

Be it known that I, HOMER C. BOSTIAN, a citizen of the United States, and resident of Milton, in the county of Northumberland and State of Pennsylvania, have invented certain new and useful Improvements in Expansion-Couplers for Hose, of which the following is a specification.

This invention relates to pipe couplings having a shank adapted to be inserted on the inside of the pipe, and more particularly to couplings which are used with rubber hose.

The object is to construct a coupling which is simple, inexpensive and efficient.

The invention consists in a hollow coupling provided with a shank which is adapted to be inserted in the pipe or hose. This shank is made expansible by having slots cut therein, and is provided at its end with threads on its interior surface. A threaded conical plug is adapted to be screwed into the end of the shank so as to expand it. This plug is provided with a square hole adapted to be engaged by a wrench or tool for the purpose of expanding the shank when it is inserted in the pipe.

Figure 1:
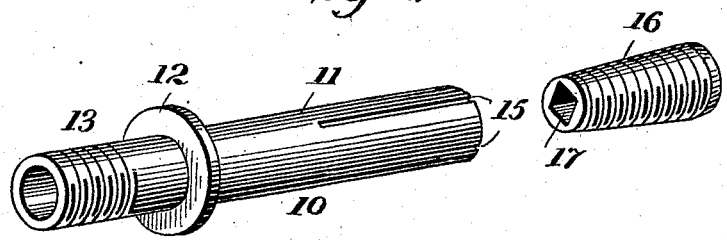
Figure 2:
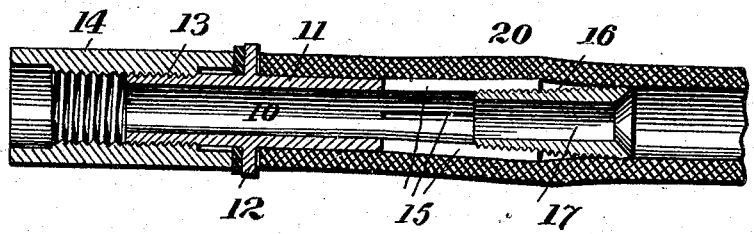
Figure 3:
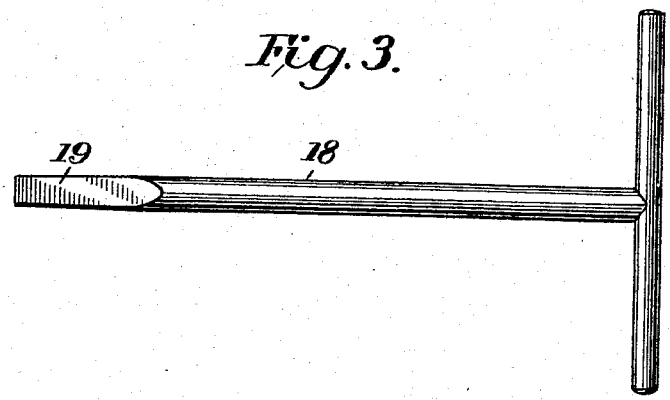

In the drawings: Figure 1 is a view showing the coupling and its expanding plug separated; Fig. 2 is a section showing the coupling in place in the pipe; Fig. 3 is a view of a form of wrench which may be used for expanding the coupling.

In Figs. 1 and 2, 10 designates the coupling provided with a shank 11, an annular flange 12, and a threaded portion or nipple 13. This threaded portion or nipple 13 is adapted to be screwed into a threaded sleeve or union 14. The shank 11 is provided with a number of slots 15 cut entirely through the shank and extending from the end in the direction of the flange 12. By thus slotting the shank it is rendered elastic so that it may be expanded. The shank is interiorly threaded at its end as shown more clearly in Fig. 2. The plug 16, which is of conical form, is exteriorly threaded and provided with a square or any other irregularly shaped hole 17. This plug is adapted to be screwed into the end of the shank so as to expand the same.

In Fig. 3, 18 designates a wrench provided with a square end 19 which fits the aperture 17 of the plug.

The method of attaching this coupling to a pipe is as follows: The plug 16 is inserted in the end of the shank 11 and screwed up sufficiently so that it will be held in place. The shank portion is then inserted in the pipe or hose 20 up to the flange 12. The shank of the wrench 18 is inserted from the nipple end of the coupling and the plug screwed up until the end of the shank 11 has been sufficiently expanded so as to make a tight joint between the pipe or hose and the coupling. The parts will then be in the position shown in Fig. 2. It will be noticed that when the parts are assembled a continuous passage is formed through the coupling body and the plug.

This coupling is particularly useful when used in connection with air hose, and by providing a union or sleeve 14, two sections of the hose may be joined together, making an air-tight joint. When used in connection with pneumatic tools, the nipple may be screwed into a socket on the tool. A nozzle may be connected to the nipple, or this nipple may be screwed into the main air-pipe line. The hose or pipe 16 may also be provided with a band of metal located over the expansible shank 11. This is a well-known expedient.

Although this invention is particularly useful when used in connection with air-hose, it is to be understood that it is not limited to such a use, nor is it limited to the particular construction shown.

What I claim is:

1. A pipe coupling comprising an expansible shank adapted to be inserted in the pipe, and means forming a part of the coupling to expand said shank.

2. A pipe coupling comprising a hollow expansible shank, and means located within the shank and forming a part of the coupling to expand the same.

3. A pipe coupling comprising a hollow expansible shank having on its inside surface a tapered portion, and a plug coöperating with said tapered portion to expand the shank.

4. A pipe coupling comprising a hollow expansible shank having on its inside surface a tapered portion, and a conical plug coöperating with the tapered portion to expand the shank.

5. A pipe coupling comprising a hollow expansible shank interiorly threaded, and means engaging the threads to expand the shank.

6. In a pipe coupling comprising a hollow expansible shank interiorly threaded, and a conical threaded plug for engaging the thread in the shank to expand the same.

7. A pipe coupling comprising a hollow expansible shank interiorly threaded, and a conical threaded plug to expand the shank, said plug having means adapted to be engaged by a removable wrench.

8. A pipe coupling comprising a hollow expansible shank interiorly threaded, a conical threaded plug having an irregularly shaped hole therein, said plug being adapted to expand the shank.

9. A pipe coupling comprising a hollow shank provided with slots, and means forming a part of the coupling to expand the shank.

10. A pipe coupling comprising a hollow shank provided with longitudinal slots and a conical plug engaging the inside of the shank to expand the same.

11. A pipe coupling comprising a hollow shank provided with longitudinal slots extending to the end of the shank, said shank being interiorly threaded, and a conical threaded plug for engaging the threads in the pipe, said plug having a longitudinally extending irregularly shaped hole.

12. A pipe coupling comprising a threaded nipple and a shank portion, an annular flange connecting the nipple and the shank, said shank being provided with longitudinal slots extending to the end of the shank, and with an internal thread at its end, and a conical threaded plug for engaging the threaded end of the shank, said plug having a longitudinally extending irregularly shaped hole therein.

In testimony whereof I affix my signature in presence of two witnesses.

HOMER C. BOSTIAN.

Witnesses:
J. F. GAUGER,
JOHN A. HEFFELFINGER.